US005239768A

United States Patent [19]
Michishita

[11] Patent Number: 5,239,768
[45] Date of Patent: Aug. 31, 1993

[54] FISHING ROD, AND ITS MANUFACTURING METHOD

[75] Inventor: Yutaka Michishita, Tokyo, Japan

[73] Assignee: Daiwa Seiko, Inc., Tokyo, Japan

[21] Appl. No.: 810,162

[22] Filed: Dec. 19, 1991

[30] Foreign Application Priority Data

Jan. 9, 1991 [JP] Japan ........................ 3-1047

[51] Int. Cl.$^5$ ........................ A01K 87/00; D02G 3/02
[52] U.S. Cl. ........................ 43/23; 43/18.1;
156/172; 57/238; 242/7.02
[58] Field of Search ........ 242/7.01, 7.02, 7.21;
43/23, 18.1, 18.5; 57/236, 238, 241, 242;
156/154, 169, 172

[56] References Cited

U.S. PATENT DOCUMENTS

| 1,318,421 | 10/1919 | Welles | 43/18.1 |
|---|---|---|---|
| 2,053,123 | 9/1936 | Alles | 57/238 |
| 2,281,647 | 5/1942 | Whitehead | 57/242 |
| 3,395,527 | 8/1968 | Longley | 57/238 |
| 4,520,623 | 6/1985 | Ogawa et al. | 57/236 |

FOREIGN PATENT DOCUMENTS

| 2505138 | 11/1982 | France | 43/18.1 |
|---|---|---|---|
| 0046373 | 4/1978 | Japan | 43/18.1 |
| 55-136265 | 3/1979 | Japan . | |
| 6088733 | 7/1981 | Japan | 43/18.1 |
| 2-249627 | 10/1990 | Japan | 43/18.1 |
| 3-064546 | 3/1991 | Japan | 57/236 |

Primary Examiner—Mark Rosenbaum
Assistant Examiner—James Miner
Attorney, Agent, or Firm—Longacre & White

[57] ABSTRACT

A soft fishing rod grip handle and a method of making such a fishing rod grip handle is set forth in which yarn is wound on a grip body. The yarn is formed by spinning in such a manner that end portions of short fibers of the yarn are held raised over the surface of the yarn member, the yarn member also including long fibers. Additionally, the end portions of the short fibers are raised over a fixing agent provided to bond the yarn member to the grip body.

10 Claims, 2 Drawing Sheets

FISHING ROD, AND ITS MANUFACTURING METHOD

BACKGROUND OF THE INVENTION

This invention relates to fishing rods, and more particularly to a fishing rod with a grip formed by winding yarn on a grip body, and to a method of manufacturing the fishing rod.

A fishing rod improved in gripping characteristic by winding yarn on its grip body has been proposed in the art, as disclosed for instance by Japanese Utility Patent Application (OPI) No. 136265/1980 (the term "OPI" as used herein means an "unexamined published application").

In the fishing rod, the grip is formed as follows: Synthetic resin yarn is wound on the grip body, and is then fixed to the latter with yarn fixing paint. Thereafter, the surface of the synthetic resin yarn thus wound is hardened, and then roughened.

In the fishing rod, since the surface of the synthetic resin yarn wound on the grip body is roughened as was described above, the resultant grip feels rough when held tightly; that is, it is improved in gripping characteristic.

However, the conventional fishing rod thus formed is still disadvantageous in the following points: As was described above, the fibers of the synthetic resin yarn wound on the grip body are hardened with the yarn fixing paint, and the surface of the synthetic resin yarn is roughened. Hence, the surface of the grip thus formed feels hard in its entirety. Accordingly, the grip may hurt the hand holding it; that is, it is difficult for a person to hold the grip in his hand for a long time.

SUMMARY OF THE INVENTION

Accordingly, an object of this invention is to eliminate the above-described difficulties accompanying a conventional fishing rod.

More specifically, an object of the invention is to provide a fishing rod in which the grip feels soft, and will not hurt the hand holding it.

Another object of the invention is to provide a method of manufacturing the fishing rod.

The foregoing objects and other objects of the invention have been achieved by the provision of (1) a fishing rod in which yarn is wound on a grip body, in which, according to the invention, yarn formed by spinning in such a manner that the end portions of short fibers are raised over it is wound on the grip body of the fishing rod with the short fibers held raised, and (2) a method of manufacturing a fishing rod which, according to the invention, comprises: the steps of: forming yarn by spinning in such a manner that the end portions of short fibers are raised over the yarn; winding the yarn thus formed on the grip body of the fishing rod; fixing the yarn thus wound to the grip body with a yarn fixing agent; and rubbing the surface of the yarn thus fixed in such a manner as to raise the short fibers.

In the fishing rod, the grip feels soft because it is formed by winding the yarn on the grip body with the short fibers raised.

In the fishing rod manufacturing method, the yarn wound on the grip body and fixed thereto with the yarn fixing agent is rubbed so that the short fibers are raised over it. Thus, the resultant grip feels soft.

The nature, utility and principle of the invention will be more clearly understood from the following detailed description and the appended claims when read in conjunction with the accompanying drawings.

DETAILED DESCRIPTION OF THE INVENTION

One preferred embodiment of this invention will be described with reference to the accompanying drawings.

Figure 1:
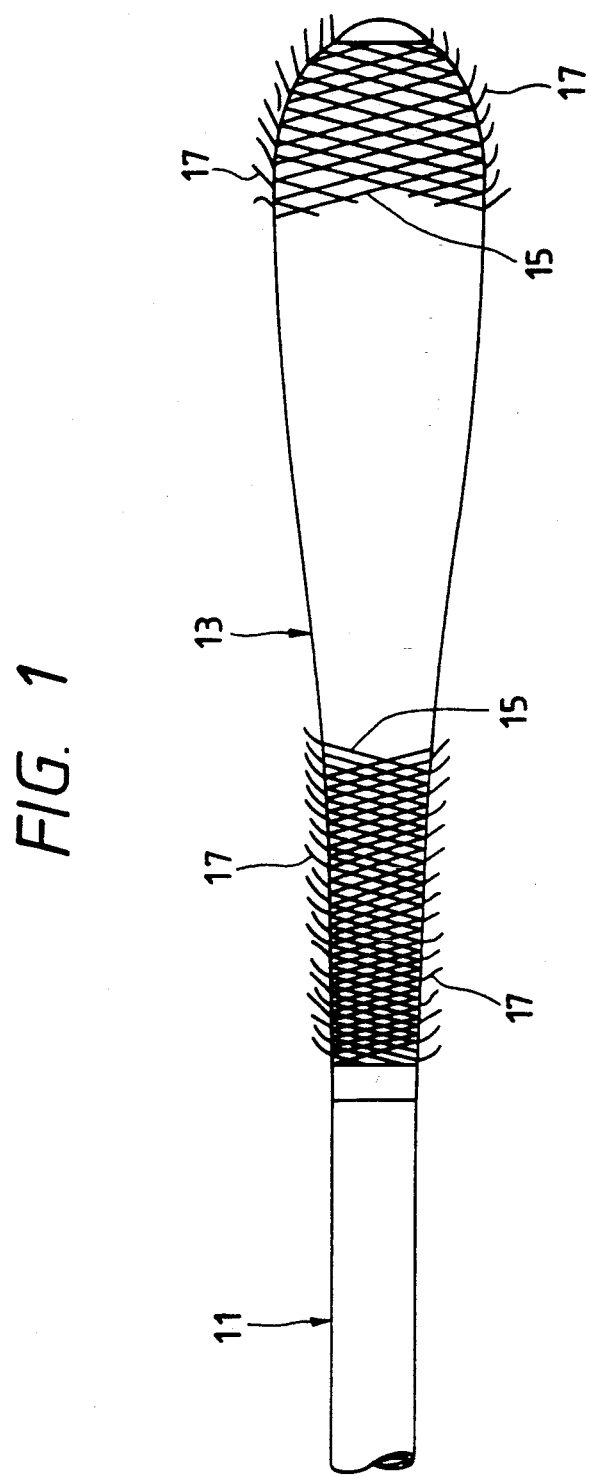
FIG. 1 is a side view showing one example of a fishing rod according to this invention.

One example of a fishing rod according to the invention, as shown in FIG. 1, comprises: a rod-shaped pipe 11 of fiber-reinforced resin. The rear end portion of the rod-shaped pipe 11 is formed into a grip body 13, on which yarn 15 is closely wound in braids or across one another. The fibers of the yarn 15 thus wound are raised; that is, the end portions of short fibers 17 are protruded from the surface of the wound yarn 15.

Figure 2:
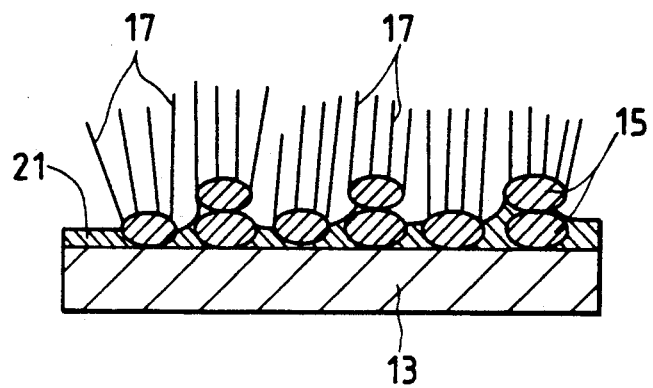
FIG. 2 is a sectional view showing a part of the fishing rod.

The fishing rod is manufactured as follows:

First, as shown in FIG. 2, the yarn 15 is wound on the grip body 13.

Figure 3:
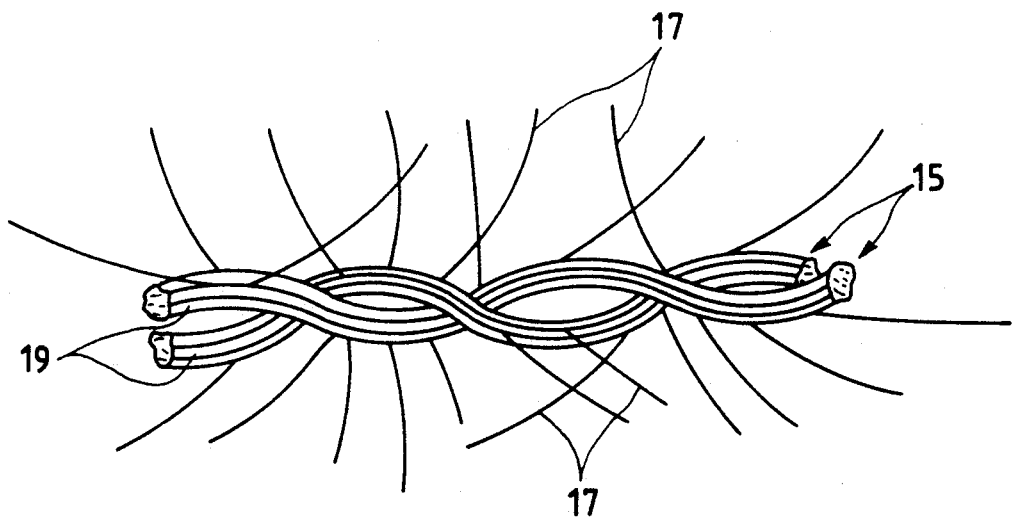
FIG. 3 is an explanatory diagram showing the yarn wound on the fishing rod.

The yarn 15 is formed substantially elliptic in section as follows: As shown in FIG. 3, long fibers 19 and soft short fibers 17 are spun in such a manner that the end portions of short fibers 17 are raised.

In the embodiment, the long fibers 19 are for instance acrylic fibers, and the short fibers 17 are soft ones which do not adsorb a yarn fixing agent (described later) at all or slightly adsorb the latter.

That is, the short fibers 17 may be natural fibers such as wool and down, or olefin fibers such as polypropylene fibers and polyethylene, or cotton yarn coated with fat.

The short fibers 17 are several centimeters to several tens of centimeters in length. The long fibers 19 and the short fibers 17 are mixed together, for instance, in the following ratio:

Long fibers 19–65% by weight
Short fibers 17–35% by weight

In forming the yarn 15, the long and short fibers are spun in such a manner that they are not twisted so much, and the end portions of the short fibers 17 are raised.

In order to prevent the yarn 15 wound on the grip body 13 from being cut or loosened, and to prevent the hand from slipping from the grip, it is desirable that the yarn 15 is wound on it in braids or across one another. The yarn 15 may by fittingly wound in other ways such as a one-way winding.

A yarn fixing agent 21 such as epoxy paint or urethane paint is applied to the yarn 15 wound on the grip body 13, so that the yarn 15 is fixed to the latter 13.

After the yarn fixing agent 12 thus applied is dried and hardened, the surface of the yarn 15 wound on the grip body 13 is rubbed for instance with buff material "Scotch belt" until the short fibers 17 of the yarn 15 are raised to several millimeters to three centimeters. In this work, the short fibers thus raised will not readily come off, because the larger parts of the short fibers forming the yarn have been strongly fixed to the grip body 13.

In the manufacture of the fishing rod according to the invention, as was described above the yarn 15 is formed in such a manner that the end portions of the short fibers 17 are raised over the outer surface of the yarn 15, and the yarn 15 thus formed is wound on the grip body 13 with the short fibers 17 held raised. Thus, the resultant grip feels considerably soft, and will not hurt the hand holding it.

That is, as was described above, the short fibers 17 are held raised over the grip, and therefore the grip feels soft, unlike the conventional grip which feels hard because of the yarn fixing paint applied thereto. In addition, for the same reason, the grip will not hurt the hand holding it, and a person can hold the grip for a long time.

Furthermore, in the manufacture of the fishing rod, as was described above, the fiber 15 is formed by spinning the short fibers 17 and the long fibers 19 in such a manner that the short fibers 17 are raised. Hence, the larger parts of the short fibers 17 forming the yarn 15 are firmly fixed to the grip body 13, and accordingly the short fibers thus raised are positively prevented from coming off.

In addition, in the fishing rod manufacturing method, as was described above, the yarn 15 formed by spinning in such a manner that the end portions of the soft short fibers 17 are raised over it is wound on the grip body 13 of the fishing rod, and is then fixed to it with the yarn fixing agent 21, and thereafter the surface of the yarn thus fixed is rubbed so as to raise the short fibers 17. Hence, as is seen from FIG. 1, the resultant grip of the fishing rod feels considerably soft. That is, the fishing rod can be readily manufactured whose grip will never hurt the hand holding it.

In the above-described embodiment, the yarn 15 is formed by spinning the long fibers 19 and the short fibers 17; however, it should be noted that the invention is not limited thereto or thereby. That is, it goes without saying that the yarn 15 may be formed by using only short fibers. With the yarn formed by spinning short fibers only, the short yarns can be raised more effectively, and the resultant grip feels softer.

Furthermore, in the above-described embodiment, the yarn is formed substantially elliptic in section; however, the invention is not limited thereto or thereby. That is, the yarn may be formed circular in section, or it may be in the form of a belt.

In addition, in the above-described embodiment, the yarn 15 is wound directly on the grip body 13. However, it goes without saying that rubber adhesive may be applied to the grip body 13 before the yarn is wound on it. In this modification, the yarn 15 more positively fixed to the grip body 13.

Moreover, in the above-described embodiment, the grip body 13 is made of the fiber-reinforced resin; however, the invention is not limited thereto or thereby. For instance, the grip body may be made of cork. In this case, it is recommended to coat the grip body with rubber adhesive to more firmly fix the yarn to the grip body.

In the fishing rod of the invention, manufacturing method, the yarn formed by spinning in such a manner that the end portions of the soft short fibers raised over it is wound on the grip body 13 of the fishing rod with the short fibers held raise. Hence, the resultant grip of the fishing rod feels considerably soft. That is, the fishing rod can be readily manufactured whose grip will never hurt the hand holding it.

In the fishing rod manufacturing method of the invention, the yarn formed by spinning in such a manner that the end portions of the soft short fibers are raised over it is wound on the grip body of the fishing rod, and is then fixed to it with the yarn fixing agent, and thereafter the surface of the yarn thus fixed is rubbed so as to raise the short fibers. That is, the fishing rod can be readily manufactured whose grip feels soft and will never hurt the hand holding it.

While there has been described in connection with the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A fishing rod in which yarn is wound on a grip body, which comprises:
   a grip which is formed by winding yarn, which is formed by spinning in such a manner that the end portions of short fibers are raised over said yarn, on said grip body with said short fibers also held raised above a surface of a fixing agent.

2. A method of manufacturing a fishing rod comprising the steps of:
   forming a yarn by spinning in such a manner that the end portions of short fibers are raised over said yarn,
   winding said yarn thus formed on a grip body of said fishing rod,
   fixing said yarn thus wound to said grip body with a yarn fixing agent, and
   rubbing the surface of said yarn thus fixed in such a manner as to raise said short fibers over a surface of said yarn fixing agent.

3. A fishing rod comprising:
   a grip body; and
   a yarn member which is wound on said grip body, said yarn member including short fibers,
   wherein said yarn member is formed by spinning in such a manner that the end portions of said short fibers are raised over a surface of said yarn member and raised over a fixing means adapted to bond said yarn member to said grip body.

4. A fishing rod according to claim 3, wherein said yarn member is wound on said grip body with said short fibers held raised.

5. A fishing rod according to claim 3, wherein said yarn member is fixedly secured on said grip body by a yarn fixing agent.

6. A fishing rod according to claim 3, wherein said yarn member further including long fibers.

7. A fishing rod according to claim 3, wherein said short fibers is selected from the group consisting of natural fibers, olefin fibers, and cotton yarn coated with fat.

8. A fishing rod according to claim 5, wherein said long fibers are made of acrylic fibers.

9. A fishing rod comprising:
   a grip body; and
   a yarn member which is wound on said grip body, said yarn member including short fibers and long fibers, said yarn member formed by spinning in such a manner that the end portions of said short fibers are raised over the surface of said yarn member;

wherein said yarn comprises 65% by weight of long fibers and 35% by weight of short fibers.

10. A method of manufacturing a fishing rod comprising the steps of:

forming a yarn by spinning in such a manner that the end portions of short fibers are raised over said yarn, applying a yarn fixing agent to a grip body of said fishing rod, winding said yarn thus formed on said grip body of said fishing rod wherein said yarn is affixed to said grip body in such a manner as to raise said short fibers over a surface of said yarn fixing agent.

* * * * *